(12) United States Patent
Zurlo et al.

(10) Patent No.: US 10,557,434 B2
(45) Date of Patent: Feb. 11, 2020

(54) KNOCK SENSOR SYSTEMS AND METHODS FOR VALVE RECESSION CONDITIONS

(71) Applicant: AI ALPINE US BIDCO INC, Wilmington, DE (US)

(72) Inventors: James Richard Zurlo, Waukesha, WI (US); Stephan Laiminger, Waukesha, WI (US)

(73) Assignee: AI ALPINE US BIDCO INC, Wilmington, DE (US)

( * ) Notice: Subject to any disclaimer, the term of this patent is extended or adjusted under 35 U.S.C. 154(b) by 80 days.

(21) Appl. No.: 15/877,363

(22) Filed: Jan. 22, 2018

(65) Prior Publication Data

US 2019/0226416 A1    Jul. 25, 2019

(51) Int. Cl.
| | | |
|---|---|---|
| F01L 1/34 | (2006.01) | |
| F02D 41/22 | (2006.01) | |
| G07C 5/08 | (2006.01) | |
| F02D 41/24 | (2006.01) | |
| F01L 1/22 | (2006.01) | |
| G01M 15/06 | (2006.01) | |
| G01M 15/05 | (2006.01) | |
| G01L 23/22 | (2006.01) | |
| F02D 41/00 | (2006.01) | |

(52) U.S. Cl.
CPC ............ F02D 41/22 (2013.01); F01L 1/22 (2013.01); F02D 41/2422 (2013.01); G01L 23/221 (2013.01); G01M 15/05 (2013.01); G01M 15/06 (2013.01); G07C 5/0825 (2013.01); F02D 41/009 (2013.01); F02D 2200/025 (2013.01)

(58) Field of Classification Search
CPC .............. F02D 41/22; F02D 41/2422; F02D 2200/025; F01L 2800/11; F01L 1/22; G01M 15/05
USPC .................. 123/90.15, 90.17, 90.1
See application file for complete search history.

(56) References Cited

U.S. PATENT DOCUMENTS

| | | | | |
|---|---|---|---|---|
| 9,933,334 | B2 * | 4/2018 | Rivellini | G01M 15/05 123/90.15 |
| 10,288,003 | B1 * | 5/2019 | Shrivastava | F02D 41/1446 123/90.15 |

OTHER PUBLICATIONS

Sandro Rivellini, Cylinder head Acceleratin Measurement for Valve Train Diagnostics System and Method, U.S. Pat. No. 2016/0370254, dated Dec. 22, 2016. (Year: 2016).*
Shrivastava et al., System and Method of Valve Wear Detection, U.S. Pat. No. 2019/0128203, dated May 2, 2019. (Year: 2019).*

* cited by examiner

*Primary Examiner* — Ching Chang
(74) *Attorney, Agent, or Firm* — Fletcher Yoder, P.C.

(57) ABSTRACT

In one embodiment, a method is provided. The method includes receiving a signal representative of an engine vibration transmitted via a knock sensor, wherein the knock sensor is disposed in an engine. The method additionally includes deriving a valve wear measurement during operation of the engine based on the signal. The method further includes communicating the valve wear measure.

17 Claims, 7 Drawing Sheets

KNOCK SENSOR SYSTEMS AND METHODS FOR VALVE RECESSION CONDITIONS

BACKGROUND

The subject matter disclosed herein relates to systems and methods for valve recession conditions, and more specifically, to knock sensor systems and method applied to valve recession conditions.

Combustion engines will typically combust a carbonaceous fuel, such as natural gas, gasoline, diesel, and the like, and use the corresponding expansion of high temperature and pressure gases to apply a force to certain components of the engine, e.g., piston disposed in a cylinder, to move the components over a distance. Each cylinder may include one or move valves that open and close correlative with combustion of the carbonaceous fuel. For example, an intake valve may direct an oxidizer such as air into the cylinder, which is then mixed with fuel and combusted. Combustion fluids, e.g., hot gases, may then be directed to exit the cylinder via an exhaust valve. Accordingly, the carbonaceous fuel is transformed into mechanical motion, useful in driving a load. For example, the load may be a generator that produces electric power. As the valves (e.g., valve seats) wear, valve clearance may be reduced and valve recession may occur. It would be beneficial to improve detection of valve recession and wear.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a method is provided. The method includes receiving a signal representative of an engine vibration transmitted via a knock sensor, wherein the knock sensor is disposed in an engine. The method additionally includes deriving a valve wear measurement during operation of the engine based on the signal. The method further includes communicating the valve wear measure.

In a second embodiment, a system includes an engine control system comprising a processor configured to receive a signal representative of an engine vibration transmitted via a knock sensor, wherein the knock sensor is disposed in an engine. The processor is further configured to derive a valve wear measurement during operation of the engine based on the signal. The processor is additionally configured to communicate the valve wear measurement.

In a third embodiment, a tangible, non-transitory computer readable medium storing code is provided. The code is configured to cause a processor to receive a signal representative of an engine vibration transmitted via a knock sensor, wherein the knock sensor is disposed in an engine. The code is additionally configured to derive a valve wear measurement during operation of the engine based on the signal, and to communicate the valve wear measurement.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
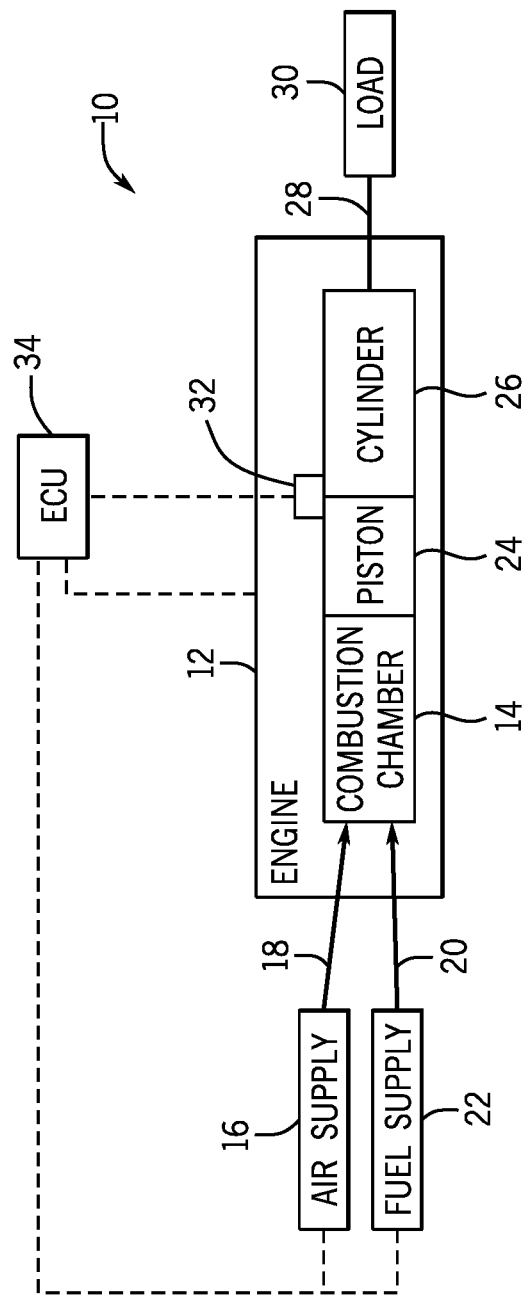
FIG. 1 is a block diagram of an embodiment of an engine driven power generation system in accordance with aspects of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The techniques described herein include the use of one or more knock sensor systems and methods that may detect a dynamic response of a various gas engine components during engine operations to derive conditions related to the components and component conditions, including valve recession. For example, knock sensors signals related to a variety of engine components may be detected, including cylinder head components (e.g., cylinder head and gaskets), cylinder block components (e.g., cylinder block, cylinder sleeves), valves train components (e.g., valves, valve seats, valve stems), camshaft and drive components (e.g., camshaft, cam lobes, timing belts/chains, tensioners), piston components (e.g., pistons, piston rings, connection rods), crankshaft assembly components (e., crankshaft, engine bearings, flywheels), gear train components (e.g., gearbox, gears, output shaft), and so on.

The knock sensor signals detected may then be compared, for example, by using a "look up" table to determine certain engine conditions that may have cause the knock sensor signals, including changes in valve geometry. Indeed, rather than applying techniques to separate knock from other noise data present in knock sensor signals, the techniques described herein embrace the "spurious" data and apply the data to determine a variety of engine conditions. By having a look up table of the engine's key components related to, for example, crank angle degree, the engine's components can be indexed with respect to temporal windows related to crank angle degree to cross-check and estimate what key component and component condition is likely causing the noise. For example, as valve wear, the knock sensor signal may change, and the change may be used to derive a valve recession measurement. Accordingly, a more proactive engine maintenance and repair process may be provided.

Turning to the drawings, FIG. 1 illustrates a block diagram of an embodiment of a portion of an engine driven power generation system 10. As described in detail below, the system 10 includes an engine 12 (e.g., a reciprocating internal combustion engine) having one or more combustion chambers 14 (e.g., 1, 2, 3, 4, 5, 6, 7, 8, 10, 12, 14, 16, 18, 20, or more combustion chambers 14). Though FIG. 1 shows a combustion engine 12, it should be understood that any reciprocating device may be used. An air supply 16 is configured to provide a pressurized oxidant 18, such as air, oxygen, oxygen-enriched air, oxygen-reduced air, or any combination thereof, to each combustion chamber 14. The combustion chamber 14 is also configured to receive a fuel 20 (e.g., a liquid and/or gaseous fuel) from a fuel supply 22, and a fuel-air mixture ignites and combusts within each combustion chamber 14. The hot pressurized combustion gases cause a piston 24 adjacent to each combustion chamber 14 to move linearly within a cylinder 26 and convert pressure exerted by the gases into a rotating motion, which causes a shaft 28 to rotate. Further, the shaft 28 may be coupled to a load 30, which is powered via rotation of the shaft 28. For example, the load 30 may be any suitable device that may generate power via the rotational output of the system 10, such as an electrical generator. Additionally, although the following discussion refers to air as the oxidant 18, any suitable oxidant may be used with the disclosed embodiments. Similarly, the fuel 20 may be any suitable gaseous fuel, such as natural gas, associated petroleum gas, propane, biogas, sewage gas, landfill gas, coal mine gas, for example.

The system 10 disclosed herein may be adapted for use in stationary applications (e.g., in industrial power generating engines) or in mobile applications (e.g., in cars or aircraft). The engine 12 may be a two-stroke engine, three-stroke engine, four-stroke engine, five-stroke engine, or six-stroke engine. The engine 12 may also include any number of combustion chambers 14, pistons 24, and associated cylinders 26 (e.g., 1-24). For example, in certain embodiments, the system 10 may include a large-scale industrial reciprocating engine 12 having 4, 6, 8, 10, 16, 24 or more pistons 24 reciprocating in cylinders 26. In some such cases, the cylinders 26 and/or the pistons 24 may have a diameter of between approximately 13.5-34 centimeters (cm). In some embodiments, the cylinders 26 and/or the pistons 24 may have a diameter of between approximately 10-40 cm, 15-25 cm, or about 15 cm. The system 10 may generate power ranging from 10 kW to 10 MW. In some embodiments, the engine 12 may operate at less than approximately 1800 revolutions per minute (RPM). In some embodiments, the engine 12 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 12 may operate between approximately 750-2000 RPM, 900-1800 RPM, or 1000-1600 RPM. In some embodiments, the engine 12 may operate at approximately 1800 RPM, 1500 RPM, 1200 RPM, 1000 RPM, or 900 RPM. Exemplary engines 12 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

The driven power generation system 10 may include one or more knock sensors 32 suitable for detecting engine "knock" and/or other run characteristics of the engine 12. The knock sensor 32 may be any sensor configured to sense vibration caused by the engine 12, such as vibration due to detonation, pre-ignition, and or pinging. The knock sensor 32 is shown communicatively coupled to a controller (e.g., a reciprocating device controller), engine control unit (ECU) 34. During operations, signals from the knock sensors 32 are communicated to the ECU 34 to determine if knocking conditions (e.g., pinging), or other behaviors exist. The ECU 34 may then adjust certain engine 12 parameters to ameliorate or avoid the undesirable conditions. For example, the ECU 34 may adjust ignition timing and/or adjust boost pressure to avoid knocking. As further described herein, the knock sensors 32 may additionally detect other vibrations beyond knocking. It is to be noted that the same signal may be used for both analysis of knocking as well as for analysis of other conditions, such as valve recession.

More specifically, the one or more knock sensors 32 may be used to detect a variety of signals and to correlate the signals based on crank angle degrees, noise signatures, or a combination thereof. For example, rather than filtering out "noise" in a signal so that the signal only detects knock, the knock sensor's 32 signal used to detect nock may also be analyzed in its entirety to determine certain engine conditions, including valve recession. In one embodiment, the signal may be analyzed by using a look table described in more detail below, to determine if the noise detected is correlative to a certain crank angle or timing. If so, then the condition that caused the noise may be narrowed down to a small set or a single condition (e.g., a specific valve geometry or valve geometry range). Additionally or alternatively, a noise signature analysis may be performed, and the noise signature of the detected noise, in combination with the look up table, may narrow down the condition set even further.

Figure 2:
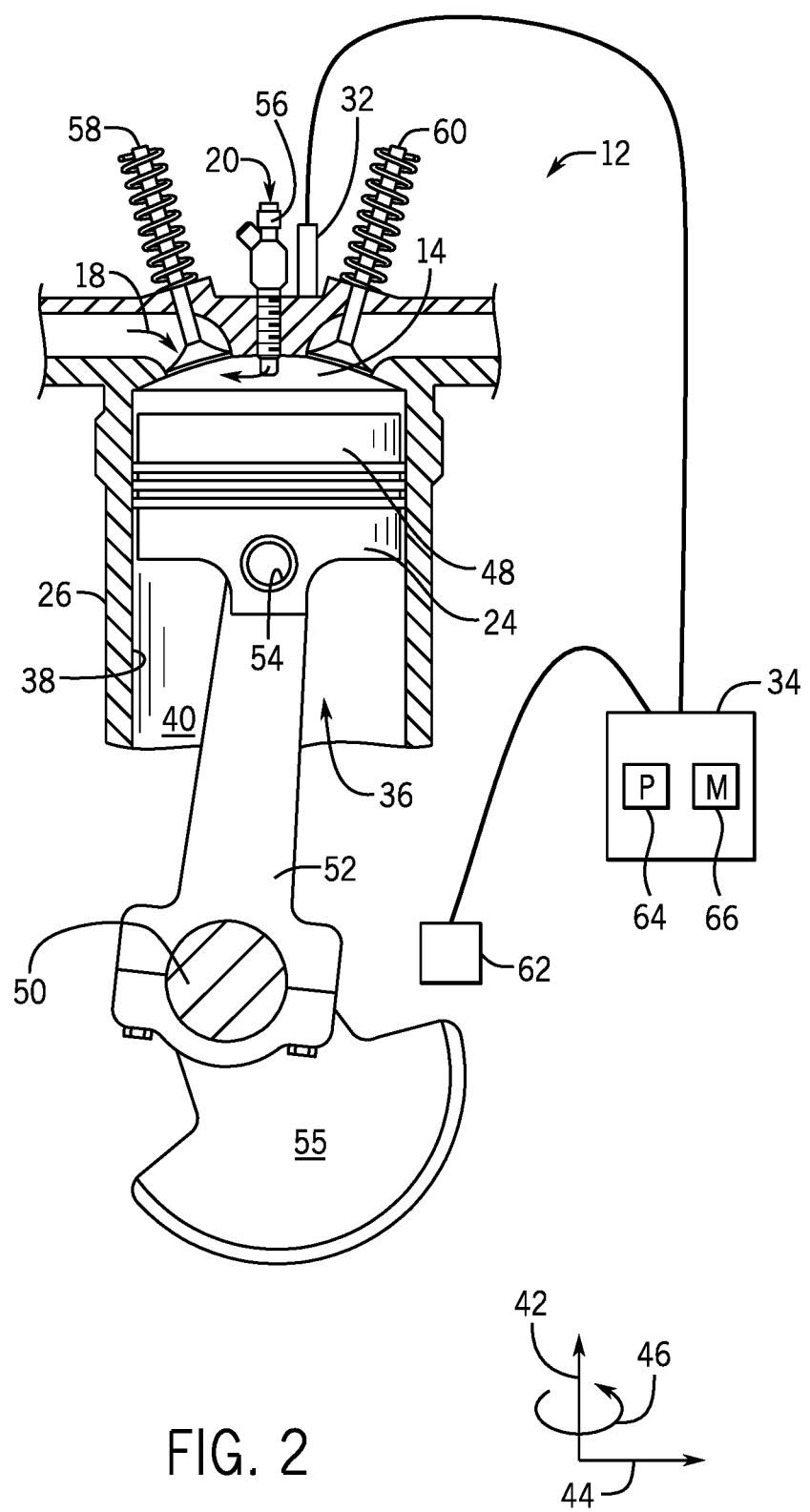
FIG. 2 is a side cross-sectional view of an embodiment of a piston assembly in accordance with aspects of the present disclosure.

FIG. 2 is a side cross-sectional view of an embodiment of a piston assembly 36 having a piston 24 disposed within a cylinder 26 (e.g., an engine cylinder) of the reciprocating engine 12. The cylinder 26 has an inner annular wall 38 defining a cylindrical cavity 40 (e.g., bore). The piston 24 may be defined by an axial axis or direction 42, a radial axis or direction 44, and a circumferential axis or direction 46. The piston 24 includes a top portion 48 (e.g., a top land). The top portion 48 generally blocks the fuel 20 and the air 18, or a fuel-air mixture, from escaping from the combustion chamber 14 during reciprocating motion of the piston 24.

As shown, the piston 24 is attached to a crankshaft 50 via a connecting rod 52 and a pin 54. Also shown is a counterweight 55 of the crankshaft 50 useful in balancing a weight of a crank throw. The crankshaft 50 translates the reciprocating linear motion of the piston 24 into a rotating motion. As the piston 24 moves, the crankshaft 50 rotates to power the load 30 (shown in FIG. 1), as discussed above. As shown, the combustion chamber 14 is positioned adjacent to the top land 48 of the piston 24. A fuel injector 56 provides the fuel 20 to the combustion chamber 14, and an intake valve 58 controls the delivery of air 18 to the combustion chamber 14. An exhaust valve 60 controls discharge of exhaust from the engine 12. However, it should be understood that any suitable elements and/or techniques for providing fuel 20 and air 18 to the combustion chamber 14 and/or for discharging exhaust may be utilized, and in some embodiments, no fuel injection is used. In operation, combustion of the fuel 20 with the air 18 in the combustion chamber 14 cause the piston 24 to move in a reciprocating manner (e.g., back and forth) in the axial direction 42 within the cavity 40 of the cylinder 26.

During operations, when the piston 24 is at the highest point in the cylinder 26 it is in a position called top dead center (TDC). When the piston 24 is at its lowest point in the cylinder 26, it is in a position called bottom dead center (BDC). As the piston 24 moves from top to bottom or from bottom to top, the crankshaft 50 rotates one half of a revolution. Each movement of the piston 24 from top to bottom or from bottom to top is called a stroke, and engine 12 embodiments may include two-stroke engines, three-stroke engines, four-stroke engines, five-stroke engine, six-stroke engines, or more.

During engine 12 operations, a sequence including an intake process, a compression process, a power process, and an exhaust process typically occurs. The intake process enables a combustible mixture, such as fuel and air, to be pulled into the cylinder 26, thus the intake valve 58 is open and the exhaust valve 60 is closed. The compression process compresses the combustible mixture into a smaller space, so both the intake valve 58 and the exhaust valve 60 are closed. The power process ignites the compressed fuel-air mixture, which may include a spark ignition through a spark plug system, and/or a compression ignition through compression heat. The resulting pressure from combustion then forces the piston 24 to BDC. The exhaust process typically returns the piston 24 to TDC while keeping the exhaust valve 60 open. The exhaust process thus expels the spent fuel-air mixture through the exhaust valve 60. It is to be noted that more than one intake valve 58 and exhaust valve 60 may be used per cylinder 26.

The engine 12 may also include a crankshaft sensor 62, one or more knock sensors 32, and the engine control unit (ECU) 34, which includes a processor 64 and memory 66 (e.g., non-transitory computer readable medium). The crankshaft sensor 62 senses the position and/or rotational speed of the crankshaft 50. Accordingly, a crank angle or crank timing information may be derived. That is, when monitoring combustion engines, timing is frequently expressed in terms of crankshaft 50 angle. For example, a full cycle of a four stroke engine 12 may be measured as a 720° cycle. The one or more knock sensors 32 may be a Piezo-electric accelerometer, a microelectromechanical system (MEMS) sensor, a Hall effect sensor, a magnetostrictive sensor, and/or any other sensor designed to sense vibration, acceleration, sound, and/or movement. In other embodiments, sensor 32 may not be a knock sensor in the traditional sense, but any sensor that may sense vibration, pressure, acceleration, deflection, or movement.

Because of the percussive nature of the engine 12, the knock sensor 32 may be capable of detecting engine vibrations and/or certain "signatures" related to a variety of engine conditions even when mounted on the exterior of the cylinder 26. The one or more knock sensors 32 may be disposed at many different locations on the engine 12. For example, in FIG. 2, one knock sensors 32 is shown on the head of the cylinder 26. In other embodiments, one or more knock sensors 32 may be used on the side of the cylinder 26. Additionally, in some embodiments, a single knock sensor 32 may be shared, for example, with one or more adjacent cylinders 26. In other embodiments, each cylinder 26 may include one or more knock sensors 32 on either or both sides of a cylinder 26. The crankshaft sensor 62 and the knock sensor 32 are shown in electronic communication with the engine control unit (ECU) 34. The ECU 34 includes a processor 64 and a memory 66. The memory 66 may store non-transitory code or computer instructions that may be executed by the processor 64. The ECU 34 monitors and controls and operation of the engine 12, for example, by adjusting spark timing, valve 58, 60 timing, adjusting the delivery of fuel and oxidant (e.g., air), and so on.

Knock sensors 32 are used to detect engine knock. Engine knock is the premature combustion of fuel outside the envelope of normal combustion. In some cases, the ECU 34 may attempt to reduce or avoid engine knock when it occurs by adjusting the operating parameters of the engine. For example, the ECU 34 may adjust the air/fuel mix, ignition timing, boost pressure, etc. in an effort to reduce or avoid engine knock. However, knock sensors may also be used to detect other vibrations in an engine unrelated to engine knock. More specifically, the same knock sensor signal may be processed both to detect knock as well as to detect other conditions, including valve recession conditions. In valve recession, the valve 60 or a valve seat (e.g., valve seat ring) 67 may experience wear and valve clearance or "lash" may be reduced, causing unwanted escape of combustion gases which may cause further wear to the valve 60 and/or to valve seat 67. Valve recession or valve wear may be derived as described below.

Figure 3:
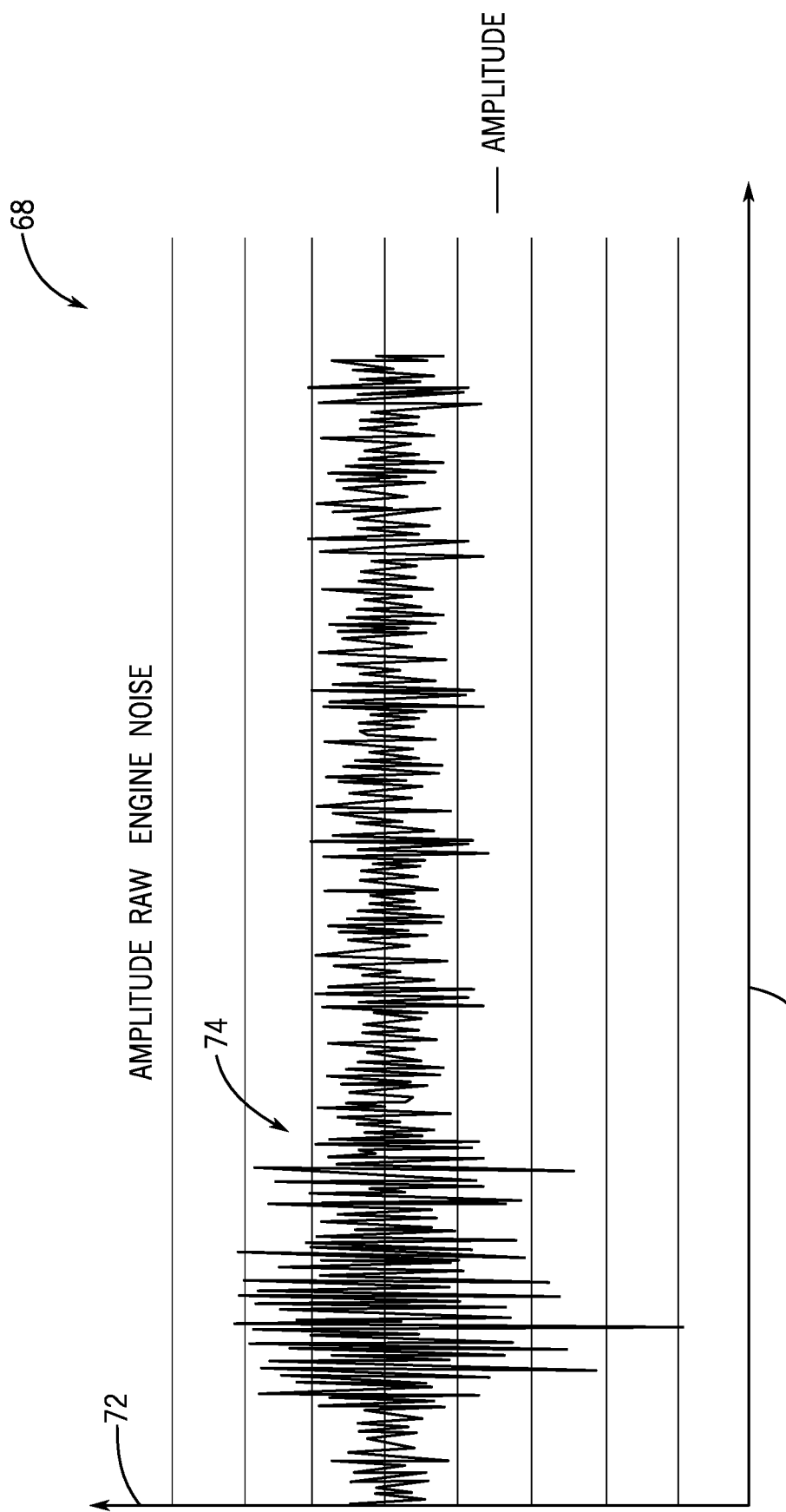
FIG. 3 is an embodiment of an engine noise plot of data measured by the knock sensor shown in FIG. 2 in accordance with aspects of the present disclosure.

FIG. 3 is an embodiment of a raw engine noise plot 68 derived (e.g., by the ECU 34) of noise data measured by a single knock sensor 32 mounted on a single cylinder 26 in which x-axis 70 is time and the y-axis 72 is raw noise amplitude. In the depicted embodiment, an amplitude curve 74 of the knock sensor 32 signal is shown. That is, the raw signal 74 includes amplitude measurements of vibration data (e.g., noise, sound data) sensed via the knock sensor 32 and plotted against time. It should be understood that this is merely a plot 68 of a sample data set, and not intended to limit plots generated by the ECU 34. It should also be understood that plot 68 is of a signature from one knock sensor 32 mounted to one cylinder 26. In other embodiments there may be multiple signatures from multiple knock sensors mounted to multiple cylinders, e.g., mating cylinders. The raw signal 74 may then be further processed, as described in more detail below, including via the use of a look up table and/or signature analysis.

Figure 4:
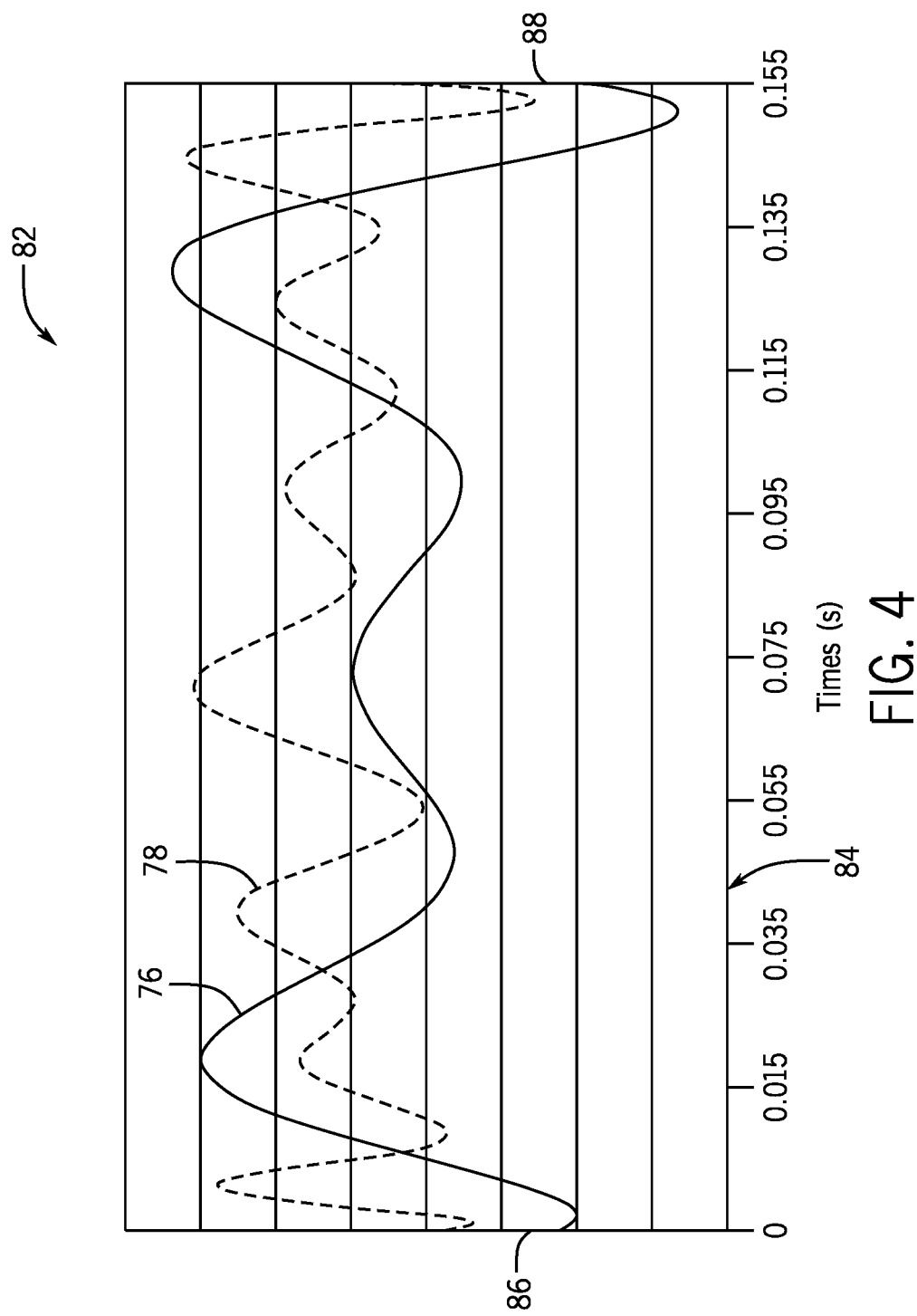
FIG. 4 is an embodiment of a combustion signature and a valve signature plotted over a first complete intake, compression, combustion and exhaust cycle in accordance with aspects of the present disclosure.

With respect to signature analysis, as shown in FIG. 4, signals can be filtered into a combustion signature 76 and a valve signature 78. Events can then be derived from the signatures and the timing of those events checked via look up table(s). Once data from the one or more knock sensors 32 is collected, one or more filters may be applied to the data to derive a combustion signature 76 (i.e., noise attributable to combustion events) and a valve signature 78 (i.e., noise attributable to valve 58, 60 movement). The combustion signature 76 and valve signature 78 may be derived by applying filters, fast Fourier transforms (FFT), or applying other digital signal processing (DSP) techniques to the sampled data. For example, the ECU 34 may derive the combustion signature 76 by applying a low pass filter at 1200 Hz or a band pass filter from 0.5 Hz to 1200 Hz. The valve signature may be derived using a band pass filter from 12 kHz to 18 kHz. FIG. 4 is an embodiment of a sample plot 82 of a combustion signature 76 and a valve signature 78 over a first complete intake, compression, and combustion and exhaust cycle. The x-axis 84 is shown as time in seconds, but may also be shown as crank angle. The y-axis 86 on the left corresponds to the valve signature 78, and the y-axis 88 on the right corresponds to the combustion signature 76. Each of the y-axes 86, 88 represents the amplitude of the corresponding noise signature 76, 78. Depending upon the measurement technique and the preference of the user, the units may be dB, volts, or some other unit). Note that the scales of the y-axes 86, 88 may be different because the amplitudes of the two signatures 76, 78 are likely to be different. FIG. 4 is illustrative of data that may be undergoing data processing, for example, via a process described in more detail with respect to the figures below. The data for FIG. 4 may include data transmitted via the knock sensor 32 and the crank angle sensor 62 once the ECU 34 has derived a combustion signature 76 and a valve signature 78 from the data using digital signal processing (DSP) techniques. Furthermore, for the sake of clarity, only a single combustion signature and a single valve signature are shown in FIG. 4. It should be understood, however, that the same or similar processing may be performed on more than one knock sensor 32 mounted to more than one cylinder.

The combustion signature 76 includes significant combustion events, such as peak firing pressure (PFP) of both the measured cylinder 26, and a mating cylinder 80 (i.e., the cylinder in the engine that is 360 degrees out of phase with the measured cylinder 26). The valve signature 78 includes the closing of the intake valve 58 and exhaust valve 60. Some combustion events, such as PFP (of both the measured cylinder 26 and the mating cylinder 80), may appear in both the combustion signature 76 and the valve signature 78. FIG. 4 shows slightly more than one complete combustion cycle, or 720 degrees of rotation (two complete revolutions) at the crankshaft 50. Each cycle includes intake, compression, combustion, and exhaust.

In one example, the signatures 76, 78, and/or the raw signal 74 may be processed to determine if any abnormal conditions exist. In one embodiment, the signatures 76, 78, and/or the raw signal 74 may be compared to a baseline, and the comparison used to determine that sufficient differences exist such that a condition affecting engine performance is occurring. In certain embodiments, the baseline may be signals representative of the engine 12 operating with valve 60 and/or valve seat 67 with no wear (e.g., new valves and valve seats). Then, as wear occurs, deviations from the baseline may be detected and used to determine valve 60 and/or valve seat 67 wear, such as recession measurements. For example, as wear occurs, a valve 60 closing angle may change. For example, the crank angle of the crank 50 may shift slightly, resulting in a new valve closing angle. The valve 60 closing angle may be representative of a recession or lash measure. That is, deviations from a baseline valve closing angle may be converted into a recession measurement in, for example, millimeters. In one example, a table may be used, where deviations, e.g., in degrees, may be converted to recession in millimeters, inches, etc. In other examples, equation(s) (e.g., geometric equations) may be used to convert from closing angles to recession measurements.

Indeed, the comparison between the signatures 76, 78, and/or the raw signal 74 and the baseline may include a crank angle degree or timing comparison. That, is differences between the signatures 76, 78, and/or the raw signal 74 and the baseline may be ascertained by comparison based on when in the engine combustion cycle the signatures 76, 78, and/or the raw signal 74 was captured, which may be correlative with the position or crank angle of the crank 50. The baseline may be derived by observing normal operations of the engine 12 over the course of multiple combustion cycles.

In another embodiment, the determination that an abnormal condition of some sort exists may be made by other techniques, such as lubricant analysis, emissions analysis, wear debris detection, and the like. Regardless of the techniques used to determine that some sort of abnormality is occurring, including baselining the signatures 76, 78, and/or the raw signal 74, the techniques described herein may additionally or alternatively aid in determining what component or components may be involved. More specifically, the techniques described herein may apply a look up table to determine component(s) of the engine 12 involved in the current condition, such as the valve 60 and/or the valve seat 67 wear.

In one embodiment, the look up table for a twelve-cylinder embodiment of the engine 12 may include a first Knock sensor window "open", followed by one or more position columns. The position columns may include cam position (degrees), crank position (degrees), #1 Right Cylinder Piston Position (inches from TDC), #1 Right Cylinder Counterweight Position Angle from Highest Point where Highest point=0 degrees, #6 Left Cylinder Piston Position (inches from TDC), #6 Left Cylinder Counterweight Position Angle from Highest Point where Highest point=0 degrees, #5 Right Cylinder Piston Position (inches from TDC), #5 Right Cylinder Counterweight Position Angle from Highest Point where Highest point=0 degrees, #2 Left Cylinder Piston Position (inches from TDC), #2 Left Cylinder Counterweight Position Angle from Highest Point where Highest point=0 degrees, #3 Right Cylinder Piston Position (inches from TDC), #3 Right Cylinder Counterweight Position Angle from Highest Point where Highest point=0 degrees, #4 Left Cylinder Piston Position (inches from TDC), and #4 Left Cylinder Counterweight Position Angle from Highest Point where Highest point=0 degrees.

The Knock sensor window "open" column may refer to a time window (e.g., time range) or crank angle window (e.g., angle range) at which a particular sensor 32 is more suited to derive engine 12 conditions, based on the one or more position columns. For example, the knock sensor 32 disposed in the #1 right cylinder 26 may be more suitable at a window or range when the camshaft position (e.g., crank position (degrees) column) is between 0 and 15 degrees. Likewise, the remainder columns crank position (degrees), #1 Right Cylinder Piston Position (inches from TDC), #1 Right Cylinder Counterweight Position Angle from Highest Point where Highest point=0 degrees, #6 Left Cylinder Piston Position (inches from TDC), #6 Left Cylinder Counterweight Position Angle from Highest Point where Highest point=0 degrees, #5 Right Cylinder Piston Position (inches from TDC), #5 Right Cylinder Counterweight Position Angle from Highest Point where Highest point=0 degrees, #2 Left Cylinder Piston Position (inches from TDC), #2 Left Cylinder Counterweight Position Angle from Highest Point where Highest point=0 degrees, #3 Right Cylinder Piston Position (inches from TDC), #3 Right Cylinder Counterweight Position Angle from Highest Point where Highest point=0 degrees, #4 Left Cylinder Piston Position (inches from TDC), and #4 Left Cylinder Counterweight Position Angle from Highest Point where Highest point=0 degrees may include data related to when a particular knock sensor 32 (e.g., #1 right, #1 left, #2 right, #2 left, #3 right, #3 left, #4 right, #4 left, #5 right, #5 left, #6 right, #6 left) is more effective at certain positions.

The look up table may be created, for example, to correlate noise received via the knock sensors 32 and corresponding position columns, with one or more engine 12 conditions, such as conditions affecting cylinder 26 head components (e.g., cylinder head and gaskets), cylinder 26 block components (e.g., cylinder block, cylinder sleeves), valve 58, 60 train components (e.g., valves, valve seats, valve stems), camshaft 50 and drive components (e.g., camshaft, cam lobes, timing belts/chains, tensioners), piston 24 components (e.g., pistons, piston rings, connection rods), crankshaft 50 assembly components (e., crankshaft, engine bearings, flywheels), gear train components (e.g., gearbox, gears, output shaft), and so on. In one embodiment, the crankshaft sensor 62 may aid in the correlation, for example, by additionally providing for crankshaft 50 position data (e.g., crank position (degrees) column). By correlating which of a particular knock sensor 32 (e.g., #1 right, #1 left, #2 right, #2 left, #3 right, #3 left, #4 right, #4 left, #5 right, #5 left, #6 right, and/or #6 left knock sensor 32, where the number and position corresponds to a cylinder 32 number and position of, for example, the 12 cylinder embodiment of the engine 12), and when the knock sensor 32 detected the unusual or unexpected noise, the techniques described herein may provide for an estimate of which component is likely causing the unexpected noise.

In certain embodiments, the estimate is an estimated recession measure. For example, various rows in the look up table would contain deviations from a baseline (e.g., baseline with new valve 60, seat 67) representative of various valve closing angles. In one embodiment, more than one look up table may be used, each table correlating noise to a specific component, set of components, engine condition, set of engine conditions, or a combination thereof. In another embodiment, the set of engine 12 conditions correlative to the position columns and the Knock sensor window "open" column may be stored as additional Condition columns in the lookup table(s). Accordingly, the techniques described herein may enable a real time detection of engine 12 conditions through, for example, existing knock sensors 32, which may result in proactive engine maintenance and repair processes.

Figure 5:
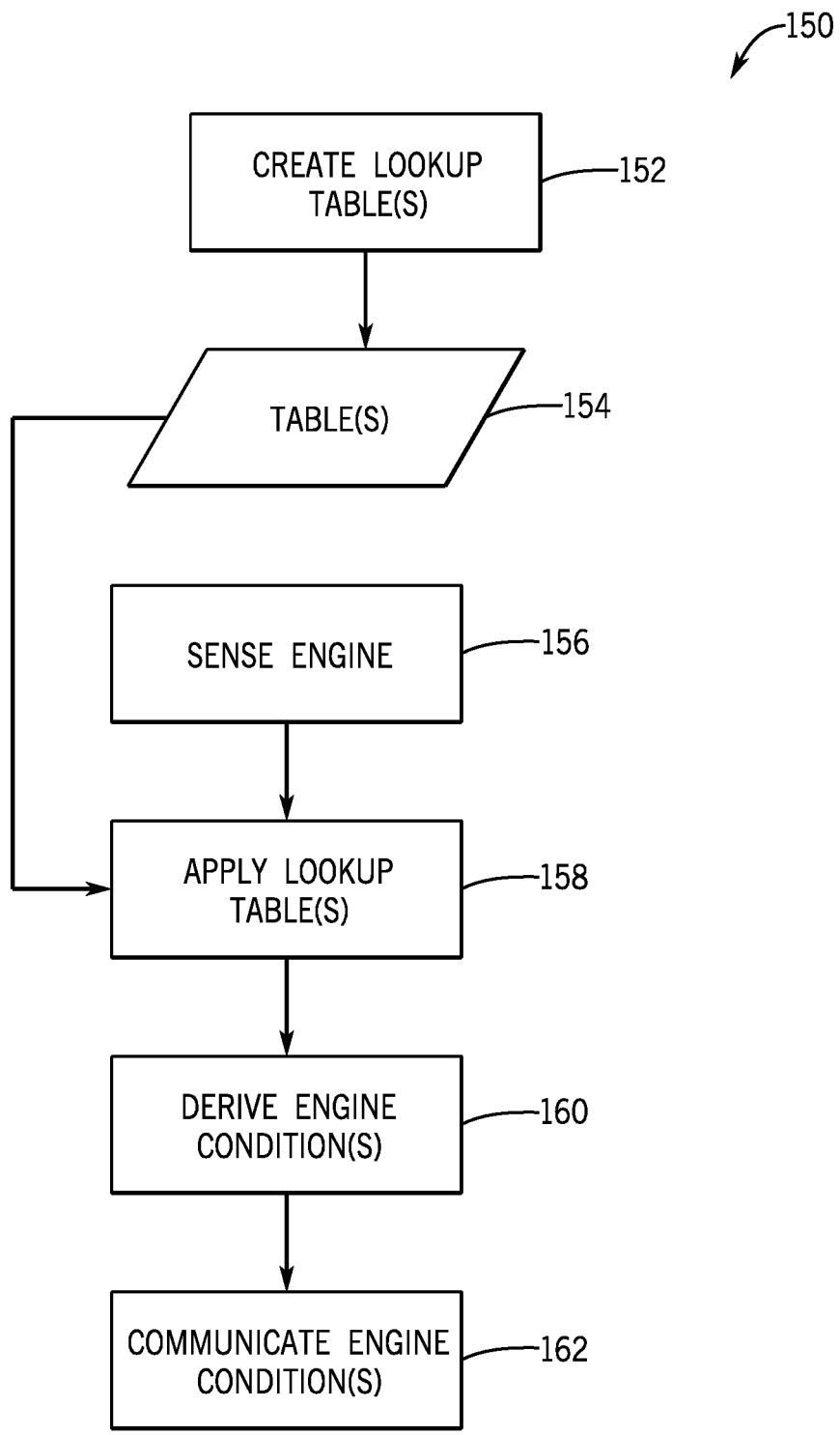
FIG. 5 is a flow chart of an embodiment of a process suitable for analyzing a vibration data and applying a lookup table.

FIG. 5 is a flow chart depicting a process 150 suitable for analyzing vibration data via the knock sensors 32 and lookup table(s). The process 150 may be implemented as computer code or instructions executable via the processor 64 and stored in the memory 66. In the depicted embodiment, the process 150 may create (block 152) one or more lookup tables 154. As mentioned above, the look up table(s) 154 may be created to correlate noise received via the knock sensors 32 and corresponding position columns, with one or more engine 12 conditions, such as conditions affecting cylinder 26 head components (e.g., cylinder head and gaskets), cylinder 26 block components (e.g., cylinder block, cylinder sleeves), valve 58, 60 train components (e.g., valves, valve seats, valve stems), camshaft 50 and drive components (e.g., camshaft, cam lobes, timing belts/chains, tensioners), piston 24 components (e.g., pistons, piston rings, connection rods), crankshaft 50 assembly components (e., crankshaft, engine bearings, flywheels), gear train components (e.g., gearbox, gears, output shaft), and so on.

In one embodiment of a twelve-cylinder engine 12, the lookup table(s) 154 may include a Knock sensor window "open" column followed by one or more position columns. The position columns may include: cam position (degrees), crank position (degrees), #1 Right Cylinder Piston Position (inches from TDC), #1 Right Cylinder Counterweight Position Angle from Highest Point where Highest point=0 degrees, #6 Left Cylinder Piston Position (inches from TDC), #6 Left Cylinder Counterweight Position Angle from Highest Point where Highest point=0 degrees, #5 Right Cylinder Piston Position (inches from TDC), #5 Right Cylinder Counterweight Position Angle from Highest Point where Highest point=0 degrees, #2 Left Cylinder Piston Position (inches from TDC), #2 Left Cylinder Counterweight Position Angle from Highest Point where Highest point=0 degrees, #3 Right Cylinder Piston Position (inches from TDC), #3 Right Cylinder Counterweight Position Angle from Highest Point where Highest point=0 degrees, #4 Left Cylinder Piston Position (inches from TDC), and #4 Left Cylinder Counterweight Position Angle from Highest Point where Highest point=0.

Each row of the lookup table(s) 154 may include a specific knock sensor 32 (e.g., #1 right, #1 left, #2 right, #2 left, #3 right, #3 left, #4 right, #4 left, #5 right, #5 left, #6 right, and/or #6 left sensor 32) in the Knock sensor window "open" column and corresponding position values for the position columns. In one embodiment, a test bed engine 12 may be instrumented and used to create the lookup table(s) 154. For example, noise related to the one or more engine 12 conditions listed above may be captured and analyzed, and the columns of the lookup table(s) 154 associated with the noise. In use, the knock sensor(s) 32 may sense (block 156) engine noise during engine 12 operations. Certain noises, such as unusual noises, may be found, for example, by using the baselining and/or signature techniques described above, or by other techniques. The noises may then be correlated by applying (block 158) the lookup table(s) 154. For example, the relevant knock sensor(s) 32 that detect the noise and/or the signals from the crankshaft sensor 62 may be used to derive values for the position columns of the table(s) 154. Based on the noise detected and/or the position of certain components (e.g., derived by using the position columns of the lookup table(s) 154), certain engine conditions may be derived (block 160). As mentioned earlier, a derived condition may be a variation from a baseline closing angle. That is, if the baseline closing angle is a number, like 386 degrees, then knock sensor 32 signals may be received, correlated to an engine condition (e.g., correlated to be a signal representative of deviation from valve closing baseline), and the look table(s) 154 may then be used to determine the deviation. For example, recognition software may be trained to recognize the knock sensor signal as being a valve closing event signal deviating from a baseline (e.g., valve closing baseline) based on crank angle and then the recognition software may "point" to a row corresponding to the deviation in the look up table(s) 154, which may include the degrees of deviation in valve closing and/or a valve recession measurement.

For example, based on cam position (degrees), crank position (degrees), #1 Right Cylinder Piston Position (inches from TDC), #1 Right Cylinder Counterweight Position Angle from Highest Point where Highest point=0 degrees, #6 Left Cylinder Piston Position (inches from TDC), #6 Left Cylinder Counterweight Position Angle from Highest Point where Highest point=0 degrees, #5 Right Cylinder Piston Position (inches from TDC), #5 Right Cylinder Counterweight Position Angle from Highest Point where Highest point=0 degrees, #2 Left Cylinder Piston Position (inches from TDC), #2 Left Cylinder Counterweight Position Angle from Highest Point where Highest point=0 degrees, #3 Right Cylinder Piston Position (inches from TDC), #3 Right Cylinder Counterweight Position Angle from Highest Point where Highest point=0 degrees, #4 Left Cylinder Piston Position (inches from TDC), and/or #4 Left Cylinder Counterweight Position Angle from Highest Point where Highest point=0, it may be possible to more easily narrow down (or fully derive) (block 160) that the noise captured by the knock sensor(s) 32 is due to a certain engine condition (e.g., valve closing event or deviation from a baseline valve closing angle), or subset of engine conditions.

The process 150 may then communicate (block 162) the derived engine 12 conditions. For example, the process 150 may display the one or more engine 12 conditions (e.g., valve recession measurement) in a display communicatively coupled to the ECU 34, set an error code (e.g., controller area network [CAN] code, on-board diagnostics II [OBD-II] code), set an alarm or an alert, and so on. By correlating noise via lookup table(s) 154, the techniques described herein may enhance engine operations and maintenance processes.

Figure 6:
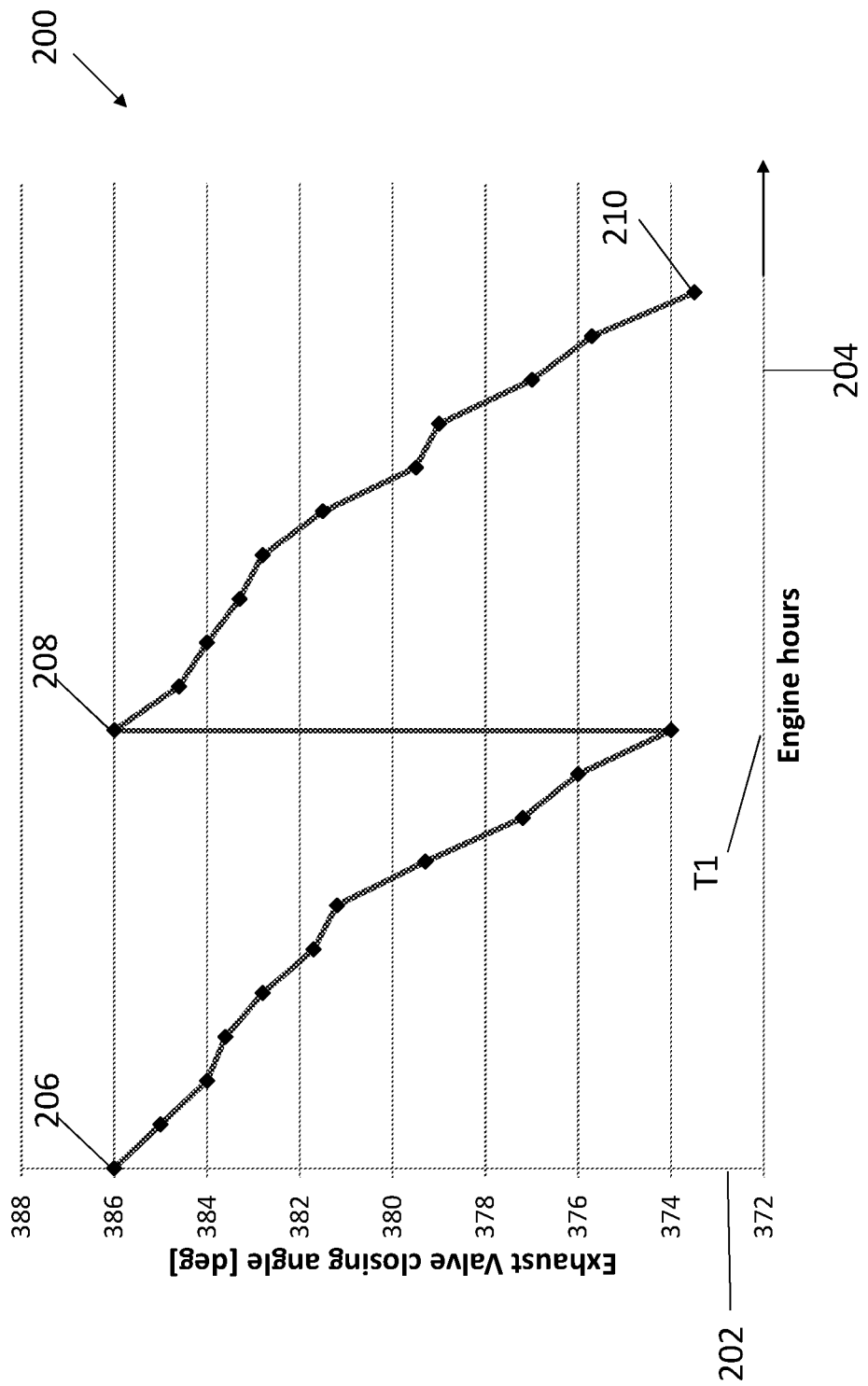
FIG. 6 is a graph illustrating an embodiment of various valve closing angles graphed at various operating engine hours.

FIG. 6 is a graph 200 illustrating an embodiment of various valve 60 closing angles shown in axis 202 graphed at various operating engine hours shown in an axis 204. In the depicted embodiment, at zero operating hours, a baseline 206 having 386 degrees of valve 60 closing angle is depicted. The baseline 206 may be representative of an adjustment (e.g., valve lash adjustment) and/or installation of new valve seats and/or new valves. As the engine 12 operates, wear cause closing angle changes until at time T1 the closing angle may now be at 374 degrees. The systems and methods described herein may have a range of valve closing angles and corresponding recession values at which a valve lash adjustment may be recommended. Likewise a new valve ring and/or a new valve may be recommended. Accordingly, the graph shows a point 208 after valve adjustment and/or new valve seat installation and/or new valve installation.

Subsequent points in the graph show changes in valve closing angles after more operating hours. That is, operating hours after T1 show changes in valve closing angles which again may be due to wear. At certain points, such as point 210, alarms/alerts, and so on, may be provided to the engine 12 operator, to ask the operator to once again perform a valve lash adjustment (or install new valve seats and/or new valves). It is to be understood that the degree values show in axis 202 are for example only, and other values may be used depending on the type of engine 12 being used. The graph 200 may also be provided to engine 12 operators via a vehicle display, a log, printed media, and so on.

Figure 7:
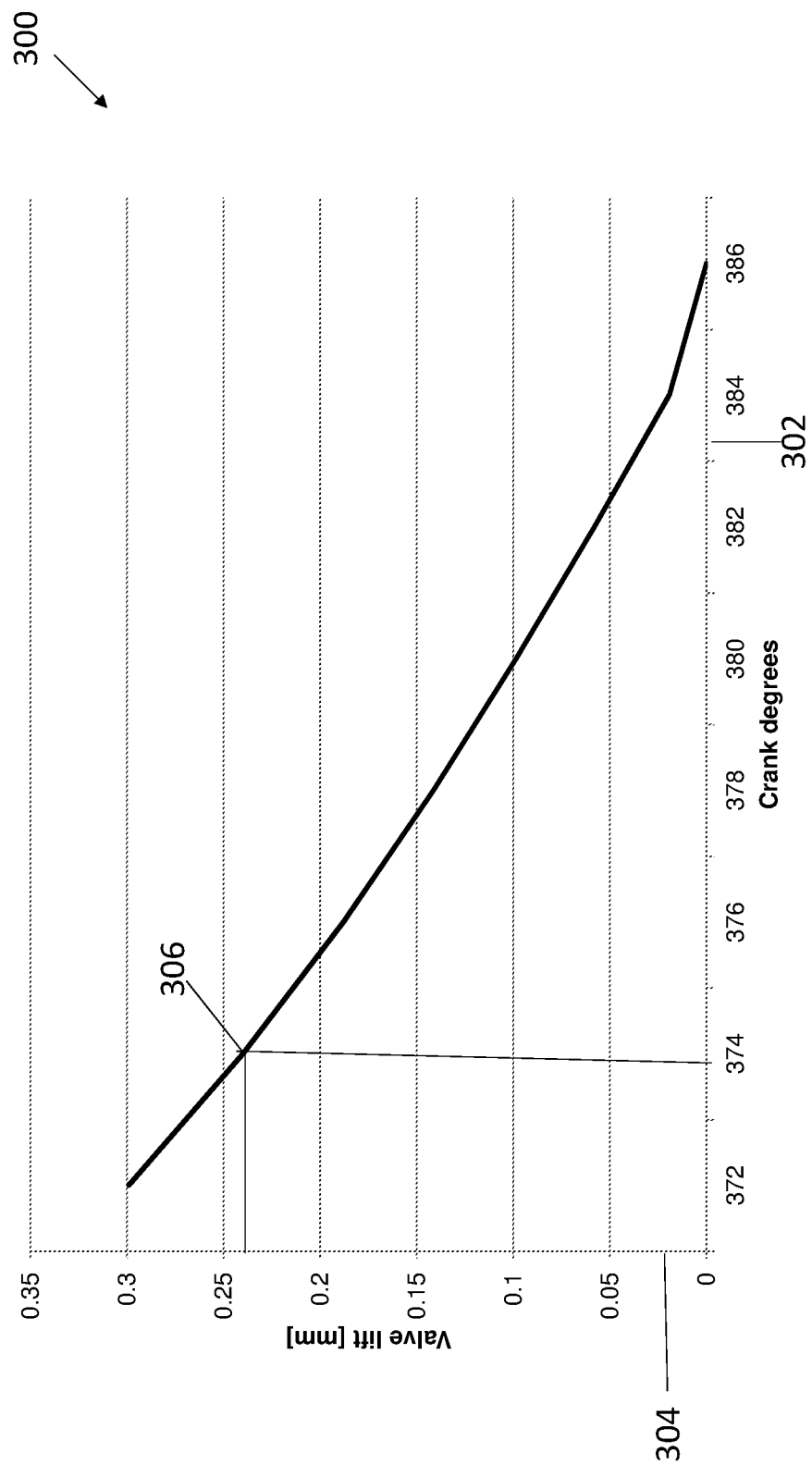
FIG. 7 is a graph showing an embodiment of various crank degrees (e.g., valve closing degrees) for convertion into valve lift measurements.

The graph 200 may be dynamically derived via the techniques described herein. That is, a running tally may be kept of operating hours for the engine 12, and after the passage of a certain time (e.g., minute, 5 minutes, 15 minutes, 30 minutes, 1 hour) the ECU 34 may then derive a valve closing angle, for example via block 160 above. According, a valve closing angle may be correlated to a given operating time for the engine 12. As mentioned earlier, valve closing angles may be converted into other measures such as valve lift. Turning now to FIG. 7, the figure is a graph 300 showing an embodiment of various crank degrees (e.g., valve closing degrees) in axis 302 being converted into valve lift points in axis 304, where valve lift is representative of valve recession measurement. In the depicted example, given an certain crank angle (e.g., 374 degrees), the graph 300 may then provide a corresponding valve lift measure (e.g., 0.237 mm). It is to be understood that the values in axis 302 and 304 are for example only.

By first deriving valve closing angles and then providing for corresponding valve lift measurements, the techniques described herein may enable improved engine 12 maintenance and increase life. For example, a range of valve lift may be set, and if a derived valve lift value is outside the range then the engine 12 operator may be notified. The engine 12 may then be maintained in a condition-based maintenance (CBM) mode, as opposed to on a schedule mode. The schedule mode may result in, for example, valve adjustments that performed unnecessarily too many times or not as often as the actual valve recession would call for.

Technical effects of the invention include detecting engine vibrations via certain sensors, such as knock sensors. Certain lookup table(s) may be created, suitable for associating one or more knock sensor "windows" with one or more conditions of certain engine components. The vibrations are correlated, via the one or more lookup tables and/or crankshaft sensor data, and certain engine conditions may be detected. The engine conditions include valve wear, valve seat wear, and the like, which may be converted into certain measurements, such as valve recession measurements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method, comprising:
   receiving, via a processor, a signal representative of an engine vibration transmitted via a knock sensor, wherein the knock sensor is disposed in an engine;
   deriving, via the processor, a valve wear measurement during operation of the engine based on the signal; and
   communicating, via the processor, the valve wear measurement, wherein deriving the valve wear measurement during operation of the engine based on the signal comprises applying a signal baseline to the signal, and wherein the signal baseline is based on signals representative of the engine operating with new valves.

2. The method of claim 1, wherein deriving the valve wear measurement comprises deriving an exhaust valve lift measurement.

3. The method of claim 2, wherein deriving the exhaust valve lift measurement comprises deriving an exhaust valve closing angle based on the signal and then converting the exhaust valve closing angle into the exhaust valve lift measurement.

4. The method of claim 1, wherein deriving the valve wear measurement comprises using at least one row of a lookup table based on the signal.

5. The method of claim 1, wherein the signal baseline comprises a valve adjustment baseline, a new valve seat installation baseline, or a combination thereof.

6. The method of claim 1, wherein deriving the valve wear measurement during operation of the engine based on the signal comprises applying a crank angle measurement.

7. The method of claim 1, wherein deriving the valve wear measurement comprises capturing a second signal via a second knock sensor, wherein the second signal is representative of an intake valve closing and wherein the signal is representative of an exhaust valve closing.

8. The method of claim 1, comprising adjusting a valve lash based when the valve wear measurement exceeds a range.

9. A system, comprising:
an engine control system comprising a processor configured to:
receive a signal representative of an engine vibration transmitted via a knock sensor, wherein the knock sensor is disposed in an engine;
derive a valve wear measurement during operation of the engine based on the signal; and
communicate the valve wear measurement, wherein the processor is configured to derive the valve wear measurement during operation of the engine based on the signal by applying a signal baseline to the signal, and wherein the signal baseline is based on signals representative of the engine operating with new valves.

10. The system of claim 9, wherein the processor is configured to derive the valve wear measurement by deriving an exhaust valve lift measurement.

11. The system of claim 10, wherein deriving the exhaust valve lift measurement comprises deriving an exhaust valve closing angle based on the signal and then converting the exhaust valve closing angle into the exhaust valve lift measurement.

12. The system of claim 10, wherein the processor is configured to derive the valve wear measurement by using at least one row of a lookup table based on the signal.

13. A tangible, non-transitory computer readable medium storing code configured to cause a processor to:
receive a signal representative of an engine vibration transmitted via a knock sensor, wherein the knock sensor is disposed in an engine;
derive a valve wear measurement during operation of the engine based on the signal; and
communicate the valve wear measurement, wherein the code is configured to derive the valve wear measurement during operation of the engine based on the signal by applying a signal baseline to the signal, and wherein the signal baseline is based on signals representative of the engine operating with new valves.

14. The tangible, non-transitory computer readable medium of claim 13, wherein causing the processor to derive the valve wear measurement comprises causing the processor to derive an exhaust valve lift measurement.

15. The tangible, non-transitory computer readable medium of claim 14, wherein causing the processor to derive the exhaust valve lift measurement comprises causing the processor to derive an exhaust valve closing angle based on the signal and then to convert the exhaust valve closing angle into the exhaust valve lift measurement.

16. The tangible, non-transitory computer readable medium of claim 13, wherein the code is configured to cause the processor to derive the valve wear measurement by using at least one row of a lookup table based on the signal.

17. The tangible, non-transitory computer readable medium of claim 13, wherein the signal baseline comprises a valve closing angle.

* * * * *